(12) United States Patent
Holtcamp

(10) Patent No.: US 6,211,105 B1
(45) Date of Patent: Apr. 3, 2001

(54) NITROGEN-CONTAINING GROUP 13 ANIONIC COMPLEXES FOR OLEFIN POLYMERIZATION

(75) Inventor: Matthew W. Holtcamp, Huffman, TX (US)

(73) Assignee: Univation Technologies, LLD, Houston, TX (US)

( * ) Notice: Subject to any disclaimer, the term of this patent is extended or adjusted under 35 U.S.C. 154(b) by 0 days.

(21) Appl. No.: 09/619,953

(22) Filed: Jul. 20, 2000

Related U.S. Application Data

(62) Division of application No. 09/191,922, filed on Nov. 13, 1998, now Pat. No. 6,147,173.

(51) Int. Cl.[7] .............................. B01J 31/00; B01J 32/00; C08F 4/02; C08F 4/60
(52) U.S. Cl. .......................... 502/103; 502/117; 502/152; 502/153; 502/155
(58) Field of Search ................................... 502/103, 117, 502/152, 153, 155

(56) References Cited

U.S. PATENT DOCUMENTS

| 5,198,401 | 3/1993 | Turner et al. | 502/155 |
|---|---|---|---|
| 5,288,677 | 2/1994 | Chung et al. | 502/152 |
| 5,427,991 | 6/1995 | Turner | 502/155 |
| 5,643,847 | 7/1997 | Walzer, Jr. | 502/117 |
| 5,854,166 | * 12/1998 | Marks et al. | 502/103 |
| 6,147,173 | * 11/2000 | Holtcamp | 502/152 |
| 6,147,174 | * 12/1998 | Holtcamp | 502/152 |

FOREIGN PATENT DOCUMENTS

| 0 277 004 | 8/1988 | (EP) . |
|---|---|---|
| 0 427 697 | 5/1991 | (EP) . |
| 0 520 732 | 12/1992 | (EP) . |
| 0 694 548 | 1/1996 | (EP) . |
| 0 771 822 | 5/1997 | (EP) . |
| WO 94/07928 | 4/1994 | (WO) . |
| WO 99/64476 | 12/1999 | (WO) . |

OTHER PUBLICATIONS

"Synthesis, reactivity, and the electronic structures of fluoro–and hydridophosphazene anions: x–ray crystal structure of $[Li(THF)_3]$ $N_3P_3F_2H(Bet_3)(\eta-C_5H_4)_2Fe^1$," Harry R. Allcock, et al, Organometallics (1991) vol. 10 (9), p. 3090–8.

Marks, et al, J. Am. Chem. Soc. 1991 vol. 113, p. 3623–3625

Baird, Michael C., et al, J. Am. Chem. Soc., 1994, vol. 116, p. 6435–6436.

"Darstellung und Eigenshaften neuer Tris(fluoraryl)borane," D. Nauman, et al, Zeitshrift fur anorganishe und allegemeine Chemie, 618 (1992) p. 74–76.

"Cationic Zirconocene Olefin Polymerization Catalysts Based on the Organo–Lewis Acid Tris(pentafluorophenyl)borane. A Synthetic, Structural, Solution Dynamic, and Polymerization Catalytic Study," Yang, et al, J. Am. Chem. Soc., vol. 116, 1994, p. 10015–10031.

James C. W. Chien, Jour. Poly. Sci.: Pt A: Poly. Chem. vol. 29, (1991) 1603–1607.

* cited by examiner

*Primary Examiner*—Mark L. Bell
*Assistant Examiner*—J. Pasterczyk
(74) *Attorney, Agent, or Firm*—Jaimes Sher; Lisa Kimes Jones

(57) ABSTRACT

This description addresses a process for the preparation of polyolefins from one or more olefinic monomers comprising combining said olefins under olefin polymerization conditions with an organometallic catalyst compound that is activated for olefin polymerization by reaction with a Group 13 element cocatalyst complex comprising at least one halogenated, nitrogen-containing aromatic group ligand. High number-average molecular weight polymers and copolymers at high rates of productivity were observed from the use of metallocene catalysts complexes when activated with $[(C_6H_5)_3C][(C_6F_5)_3B(C_5F_4N)]$.

2 Claims, No Drawings

NITROGEN-CONTAINING GROUP 13 ANIONIC COMPLEXES FOR OLEFIN POLYMERIZATION

This application is a Divisional of U.S. patent application Ser. No. 09/191,922, filed Nov. 13, 1998 now issued U.S. Pat. No. 6,147,173, issued Nov. 14, 2000.

TECHNICAL FIELD

This invention relates to the preparation of olefin polymers using ionic catalyst systems based on organometallic transition metal complexes stabilized by weakly coordinating Group 13 element anions.

BACKGROUND ART

Group 13 based Lewis acids having three fluorinated aryl substituents are known to be capable of activating transition metal compounds into olefin polymerization catalysts. Trisperfluorophenylborane is demonstrated in EP 0 425 697 and EP 0 520 732 to be capable of abstracting a ligand for cyclopentadienyl derivatives of transition metals while providing a stabilizing, compatible noncoordinating anion. See also, Marks, et al, J. Am. Chem. Soc. 1991, 113, 3623–3625. The term "noncoordinating anion" is now accepted terminology in the field of olefin polymerization, both by coordination or insertion polymerization and carbocationic polymerization. See, for example, EP 0 277 004, U.S. Pat. No. 5,198,401, and Baird, Michael C., et al, J. Am. Chem. Soc. 1994, 116, 6435–6436, and U.S. Pat. No. 5,668,324. The noncoordinating anions are described to function as electronic stabilizing cocatalysts, or counterions, for essentially cationic metallocene complexes which are active for olefin polymerization. The term noncoordinating anion as used here applies both to truly noncoordinating anions and coordinating anions that are at most weakly coordinated to the cationic complex so as to be labile to replacement by olefinically or acetylenically unsaturated monomers at the insertion site. The synthesis of Group 13-based compounds derived from trisperfluorophenylborane are described in EP 0 694 548. These compounds are said to be represented by the formula $M(C_6F_5)_3$ and are prepared by reacting the trisperfluorophenylborane with dialkyl or trialkyl Group 13-based compounds at a molar ratio of "basically 1:1" so as to avoid mixed products, those including the type represented by the formula $M(C_6F_5)_nR_{3-n}$, where n=1 or 2. Utility for trisaryl aluminum compounds in Ziegler-Natta olefin polymerization is suggested.

General synthetic work includes a description of the preparation of compounds said to be new tris(fluoroaryl) boranes in a paper by D. Naumann, and others, "Darstellung und Eigenshaften neuer Tris(fluoraryl)borane", in *Zeitshrift für anorganishe und allegemeine Chemie*, 618 (1992) 74–76. The authors include reference to the compound tris(tetrafluoroarylpyridyl) borane.

Supported non-coordinating anions derived from trisperfluorophenyl boron are described in U.S. Pat. No. 5,427,991. Trisperfluorophenyl boron is shown to be capable of reacting with coupling groups bound to silica through hydroxyl groups to form support bound anionic activators capable of activating transition metal catalyst compounds by protonation. U.S. Pat. No. 5,643,847 discusses the reaction of Group 13 Lewis acid compounds with metal oxides such as silica. It illustrates the reaction of trisperfluorophenyl boron with silanol groups (the hydroxyl groups of silicon) so as to prepare bound anions capable of protonating transition metal organometallic catalyst compounds and forming catalytically active cations counter-balanced by the bound anions.

Immobilized Lewis acid catalysts suitable for carbocationic polymerization are described in U.S. Pat. No. 5,288,677. The Group III A Lewis acids of the invention are said to have the general formula $R_nMX_{3-n}$ where M is a Group III A metal, r is a monovalent hydrocarbon radical consisting of $C_1$ to $C_{12}$ alkyl, aryl, alkylaryl, arylalkyl and cycloalkyl radicals, n=0–3, and X is halogen. Listed Lewis acids include aluminum trichloride, trialkyl aluminums, and alkylaluminum halides. Immobilization is accomplished by reacting the invention Lewis acids with hydroxyl, halide, amine, alkoxy, secondary alkyl amines, and others, where the groups are structurally incorporated in a polymeric chain. James C. W. Chien, Jour. Poly. Sci.: Pt A: Poly. Chem, Vol. 29, 1603–1607 (1991), has described the olefin polymerization utility of methylalumoxane (MAO) reacted with $SiO_2$ and zirconocenes. He proposes a covalent bonding of the aluminum atom to the silica through an oxygen atom in surface hydroxyl groups.

In view of the above there is a continuing need for activating cocatalyst compounds both to improve industrial economics and to provide simpler methods of synthesis and preparation of suitable activating compounds for ionic catalyst systems. Additionally, improvements in gas phase and slurry polymerization of olefins, where supported catalysts are typically used, are sought so as to meet the demanding criteria of industrial processes. The complexities of the polymerization media of industrial processes can result in widely varying product properties of the polymers prepared and the polymer particles formed in the reactors from which the polymerization medium must be removed for final product preparation.

BRIEF SUMMARY OF THE INVENTION

This invention addresses a process for the preparation of polyolefins from one or more olefinic monomers comprising combining said olefins with the reaction product of i) a transition metal organometallic catalyst compound and ii) a Group 13 element cocatalyst complex comprising at least one halogenated, nitrogen-containing aromatic group ligand. The Group 13 element cocatalyst complex can be a neutral, three-coordinate Lewis acid compound or it can be an ionic salt comprising a four-coordinate Group 13 element anionic complex, each containing at least one halogenated aromatic ligand having at least one nitrogen atom in the aromatic ring. The cocatalysts of the invention provide weakly coordinating anions for essentially cationic transition metal organometallic catalyst complexes that exhibit high polymerization activities.

DETAILED DESCRIPTION OF THE INVENTION

The invention provides a process for olefin polymerization in which Group 13 element cocatalyst complexes and transition metal organometallic catalyst precursor compounds can be combined to form active catalysts for olefin polymerization. Subsequent contacting, or in situ catalyst formation essentially concurrent with said contacting, with insertion polymerizable monomers, those having accessible olefinic or acetylenic unsaturation, or with monomers having olefinic unsaturation capable of cationic polymerization. The catalyst according to the invention is suitable for preparing polymers and copolymers from olefinically and acetylenically unsaturated monomers.

Neutral Lewis acid compounds of the invention are typically based on trivalent aluminum or boron complexes having at least one nitrogen-containing, aromatic group ligand. This ligand is shown to be an effective ancillary ligand for compatible, nocoordinating anion cocatalysts, despite the presence of the Lewis basic nitrogen atom(s) in the aromatic rings. Three such ligands can complement the neutral Lewis acid coordination sites. Where only one or two are the nitrogen-containing ligand, the remainder can be any of the other known stabilizing, ancillary monoanionic ligands, such as the halogenated aryl ligands of U.S. Pat. No. 5,198,401. These ancillary ligands are those sufficient to allow the Lewis acids to function as electronically stabilizing, compatible noncoordinating anions. Stable ionic complexes are achieved when the anions will not be a suitable ligand donor to the strongly Lewis acidic cationic organometallic transition metal cations used in insertion polymerization, i.e., inhibit ligand transfer that would neutralize the cations and render them inactive for polymerization. The Lewis acids fitting this description can be described by the following formula:

$R_nM(ArNHal)_{3-n}$, where R is a monoanionic ligand, M is a Group 13 metal or metalloid, preferably aluminum or boron, ArNHal is a halogenated, nitrogen-containing aromatic ring, polycyclic aromatic ring or aromatic ring assembly in which two or more rings (or fused ring systems) are joined directly to one another or together, and n=0–2. Suitable R ligands include: substituted or unsubstituted $C_1$ to $C_{30}$ hydrocarbyl aliphatic or aromatic groups, substituted meaning that at least one hydrogen on a carbon atom is replaced with a hydrocarbyl, halide, halocarbyl, hydrocarbyl or halocarbyl substituted organometalloid, dialkylamido, alkoxy, aryloxy, alkysulfido, arylsulfido, alkylphosphido, alkylphosphido or other anionic substituent; fluoride; bulky alkoxides, where bulky refers to $C_4$ and higher number hydrocarbyl groups, e.g., up to about $C_{20}$, such as tert-butoxide and 2,6-dimethylphenoxide, and 2,6-di(tert-butyl)phenoxide; —$SR^1$; —$NR^2_2$, and —$PR^3_2$, where each R is independently a substituted or unsubstituted hydrocarbyl as defined above; and, $C_1$ to $C_{30}$ hydrocarbyl substituted organometalloid, such as trimethylsilyl, methyl trimethylsilyl, etc. Preferred examples of R include the halogenated phenyl, napthyl and anthracenyl radicals of U.S. Pat. No. 5,198,401 and the halogenated biphenyl radicals of WO 97/29845. The use of the terms halogenated or halogenation means for the purposes of this application that at least one third of hydrogen atoms on carbon atoms of the aryl-substituted aromatic ligands are replaced by halogen atoms, and more preferred that the aromatic ligands be perhalogenated. Fluorine is the most preferred halogen. The ligand descriptions of each the foregoing documents are incorporated by reference for information and U.S. patent practice purposes.

The effective Group 13 element cocatalyst complexes of the invention are, in a preferable embodiment, derived from an ionic salt, comprising a 4-coordinate Group 13 element anionic complex, that can be represented as:

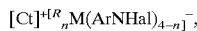

$[Ct]^+[R_nM(ArNHal)_{4-n}]^-$, where $[Ct]^+$ is a is a suitable cation that is essentially non-interfering with the ionic catalyst complexes formed with the transition metal compounds, R, M, and ArNHal are defined as above, and n=0–3. Suitable cations for salts of the noncoordinating anions of the invention cocatalysts include those known in the art. Such include nitrogen-containing cations such as those in the anilinium and ammonium salts of U.S. Pat. No. 5,198,401, and WO 97/35893, the carbenium, oxonium or sulfonium cations of U.S. Pat. No. 5,387,568, metal cations, e.g., $Ag^+$, the silylium cations of WO 96/08519, and the cations of the hydrated salts of Group 1 or 2 metals of WO 97/22635. The teachings of these references are referred to for information and incorporated by reference for the purposes of U.S. patent practice.

The halogenated, nitrogen-containing aromatic group ligands of the invention can also be used as substitute ligands for those known in the art, or with them, in Group 13 element based noncoordinating anions, specifically those identified in the prior art discussed herein, and in WO 97/29845 and EP 0 811 627.

One R group, or ligand, of the Lewis acid or anionic complex may also be bonded to a metal/metalloid oxide support or polymeric support. Lewis base-containing support substrates will react with the Lewis acidic cocatalyst activators of the invention to form support bonded Lewis acid compounds where one R group of $R_nM(ArNHal)_{3-n}$ or $[R_n(ArNHal)_{4-n}]^-$ is a chemically bonded support substrate. The Lewis base hydroxyl groups of silica or hydroxyl group modified polymers are exemplary of support materials where this method of bonding to a support at one of the Group 13 element coordination sites occurs. The teachings of U.S. Pat. No. 5,643,847 and copending U.S. application Ser. No. 60/093017, filed Jul. 16, 1998, are illustrative of these methods of support and are incorporated by reference for purposes of U.S. patent practice.

Metal or metalloid oxide supports of the described bonding method for the invention include any metal/metalloid oxides, preferably those having surface hydroxyl groups exhibiting a pKa equal to or less than that observed for amorphous silica, i.e., pKa less than or equal to about 11. In forming the invention covalently bound anionic activator the Lewis acid reacts with a silanol group (which acts as a Lewis base). Thereafter the proton of the Bronsted acid appears to protonate a ligand of the Lewis acid, abstracting it, at which time the Lewis acid becomes covalently bonded to the oxygen atom. The R replacement group of the Lewis acid then becomes R'—O—, where R' is a suitable support substrate, e.g., hydroxyl group-containing silica or polymeric supports. Accordingly any of the conventionally known silica support materials that retain hydroxyl groups after dehydration treatment methods will be suitable in accordance with the invention. Because of availability, both of silica and silica containing metal oxide based supports, for example, silica-alumina, are preferred. Silica particles, gels and glass beads are most typical. See the teachings of copending U.S. application Ser. No. 60/093,017, filed Jul. 16, 1998, incorporated by reference for purposes of U.S. prosecution. The tailoring of hydroxyl groups available as attachment sites in this invention can also be accomplished by the pre-treatment, prior to addition of the Lewis acid, with a less than stoichimetric amount of the chemical dehydrating agents, or excess of Lewis acid over sought levels of transition metal catalyst compounds. See U.S. Pat. No. 5,643,847.

Polymeric supports are preferably hydroxyl-functional-group-containing polymeric substrates, but functional groups may be any of the primary alkyl amines, secondary alkyl amines, and others, where the groups are structurally incorporated in a polymeric chain and capable of a acid-base reaction with the Lewis acid such that a ligand filling one coordination site of the Group 13 element is protonated and replaced by the polymer incorporated functionality. See, for example, the functional group containing polymers of U.S. Pat. No. 5,288,677.

Other known methods for supporting catalyst systems comprising a noncoordinating anion cocatalyst will also be suitable as means for supporting the catalyst complexes of this invention. Thus the catalyst complexes of the invention may be physically or chemically fixed to a suitable support material. See, for example, the teachings of WO 91/09882, WO 93/11172, WO 96/35726 and U.S. Pat. Nos. 4,463,135, and 5,610,115.

Transition metal compounds suitable as olefin polymerization catalysts by coordination or insertion polymerization in accordance with the invention will include the known transition metal compounds useful in traditional Ziegler-Natta coordination polymerization and as well the metallocene compounds similarly known to be useful in coordination polymerization, when such compounds are capable of catalytic activation by the cocatalyst activators described for the invention. These will typically include Group 4–10 transition metal compounds wherein at least one metal ligand can be abstracted by the cocatalyst activators, particularly those ligands including hydride, alkyl and silyl. Ligands capable of abstraction and transition metal compounds comprising them include those metallocenes described in the background art, see for example U.S. Pat. No. 5,198,401 and WO 92/00333. Syntheses of these compounds is well known from the published literature. Additionally, where the metal ligands include halogen, amido or alkoxy moieties (for example, biscyclopentadienyl zirconium dichloride) which are not capable of abstraction with the activating cocatalysts of the invention, they can be converted into suitable ligands via known alkylation reactions with organometallic compounds such as lithium or aluminum hydrides or alkyls, alkylalumoxanes, Grignard reagents, etc. See also EP-A1-0 570 982 for the reaction of organoaluminum compounds with dihalo-substituted metallocene compounds prior to addition of activating anion compounds. All documents are incorporated by reference for purposes of U.S. patent practice.

Additional description of metallocene compounds which comprise, or can be alkylated to comprise, at least one ligand capable of abstraction to form a catalytically active transition metal cation appear in the patent literature, e.g., EP-A-0 129 368, U.S. Pat. Nos. 4,871,705, 4,937,299, 5,324,800 EP-A-0 418 044, EP-A-0 591 756, WO-A-92/00333, WO-A-94/01471 and WO 97/22635. Such metallocene compounds can be described for this invention as mono- or biscyclopentadienyl substituted Group 3, 4, 5, or 6 transition metal compounds wherein the ancillary ligands may be themselves substituted with one or more groups and may be bridged to each other, or may be bridged through a heteroatom to the transition metal. The size and constituency of the ancillary ligands and bridging elements are not critical to the preparation of the ionic catalyst systems of the invention but should be selected in the literature described manner to enhance the polymerization activity and polymer characteristics being sought. Preferably the cyclopentadienyl rings (including substituted cyclopentadienyl-based fused ring systems, such as indenyl, fluorenyl, azulenyl, or substituted analogs of them), when bridged to each other, will be lower alkyl-substituted ($C_1$–$C_6$) in the 2 position (without or without a similar 4-position substituent in the fused ring systems) and may additionally comprise alkyl, cycloalkyl, aryl, alkylaryl and or arylalkyl substituents, the latter as linear, branched or cyclic structures including multi-ring structures, for example, those of U.S. Pat. Nos. 5,278,264 and 5,304,614. Such substituents should each have essentially hydrocarbyl characteristics and will typically contain up to 30 carbon atoms but may be heteroatom containing with 1–5 non-hydrogen/carbon atoms, e.g., N, S, O, P, Ge, B and Si. All documents are incorporated by reference for purposes of U.S. patent practice.

Metallocene compounds suitable for the preparation of linear polyethylene or ethylene-containing copolymers (where copolymer means comprising at least two different monomers) are essentially any of those known in the art, see again EP-A-277,004, WO-A-92/00333 and U.S. Pat. Nos. 5,001,205, 5,198,401, 5,324,800, 5,308,816, and 5,304,614 for specific listings. Selection of metallocene compounds for use to make isotactic or syndiotactic polypropylene, and their syntheses, are well-known in the art, specific reference may be made to both patent literature and academic, see for example Journal of organometallic Chemistry 369, 359–370 (1989). Typically those catalysts are stereorigid asymmetric, chiral or bridged chiral metallocenes. See, for example, U.S. Pat. Nos. 4,892,851, 5,017,714, 5,296,434, 5,278,264, WO-A-(PCT/US92/10066) WO-A-93/19103, EP-A2-0 577 581, EP-A1-0 578 838, and academic literature "The Influence of Aromatic Substituents on the Polymerization Behavior of Bridged Zirconocene Catalysts", Spaleck, W., et al, Organometallics 1994, 13, 954–963, and "ansa-Zirconocene Polymerization Catalysts with Annelated Ring Ligands-Effects on Catalytic Activity and Polymer Chain Lengths", Brinzinger, H., et al, Organometallics 1994, 13, 964–970, and documents referred to therein. Though many above are directed to catalyst systems with alumoxane activators, the analogous metallocene compounds will be useful with the cocatalyst activators of this invention for active coordination catalyst systems, when the halogen, amide or alkoxy containing ligands of the metals (where occurring) are replaced with ligands capable of abstraction, for example, via an alkylation reaction as described above, and another is a group into which the ethylene group —C=C— may insert, for example, hydride, alkyl, or silyl. All documents are incorporated by reference for purposes of U.S. patent practice.

Representative metallocene compounds can have the formula:

$$L^A L^B L^C_i MDE$$

where, $L^A$ is a substituted cyclopentadienyl or heterocyclopentadienyl ancillary ligand π-bonded to M; $L^B$ is a member of the class of ancillary ligands defined for $L_A$, or is J, a heteroatom ancillary ligand σ-bonded to M; the $L^A$ and $L^B$ ligands may be covalently bridged together through a Group 14 element linking group; $L^C_i$ is an optional neutral, non-oxidizing ligand having a dative bond to M (i equals 0 to 3); M is a Group 4 or 5 transition metal; and, D and E are independently monoanionic labile ligands, each having a σ-bond to M, optionally bridged to each other or $L^A$ or $L^B$, which can be broken for abstraction purposes by a suitable activator and into which a polymerizable monomer or macromonomer can insert for coordination polymerization.

Non-limiting representative metallocene compounds include mono-cyclopentadienyl compounds such as pentamethylcyclopentadienyltitanium isopropoxide, pentamethylcyclopentadienyltribenzyl titanium, dimethylsilyltetramethylcyclopentadienyl-tert-butylamido titanium dichloride, pentamethylcyclopentadienyl titanium trimethyl, dimethylsilyltetramethylcyclopentadienyl-tert-butylamido zirconium dimethyl, dimethylsilyltetramethylcyclopentadienyl-dodecylamido hafnium dihydride, dimethylsilyltetramethylcyclopentadienyl-dodecylamido hafnium dimethyl, unbridged biscyclopentadienyl compounds such as bis(1,3-butyl, methylcyclopentadienyl) zirconium dimethyl, pentamethylcyclopentadienyl-cyclopentadienyl zirconium dimethyl, (tetramethylcyclopentadienyl)(n-propylcyclopetadienyl)

zirconium dimethyl; bridged biscyclopentadienyl compounds such as dimethylsilylbis(tetrahydroindenyl) zirconium dichloride and silacyclobutyl (tetramethylcyclopentadienyl)(n-propyl-cyclopentadienyl) zirconium dimethyl; bridged bisindenyl compounds such as dimethylsilylbisindenyl zirconium dichloride, dimethylsilylbisindenyl hafnium dimethyl, dimethylsilylbis(2-methylbenzindenyl) zirconium dichloride, dimethylsilylbis (2-methylbenzindenyl) zirconium dimethyl; and fluorenyl ligand-containing compounds, e.g., diphenylmethyl (fluorenyl)(cyclopentadienyl)zirconium dimethyl; and the additional mono- and biscyclopentadienyl compounds such as those listed and described in U.S. Pat. Nos. 5,017,714, 5,324,800 and EP-A-0 591 756. All documents are incorporated by reference for purposes of U.S. patent practice.

Representative traditional Ziegler-Natta transition metal compounds include tetrabenzyl zirconium, tetra bis (trimethylsiylmethyl) zirconium, oxotris (trimethlsilylmethyl) vanadium, tetrabenzyl hafnium, tetrabenzyl titanium, bis(hexamethyl disilazido)dimethyl titanium, tris(trimethyl silyl methyl) niobium dichloride, tris(trimethylsilylmethyl) tantalum dichloride. The important features of such compositions for coordination polymerization are the ligand capable of abstraction and that ligand into which the ethylene (olefinic) group can be inserted. These features enable the ligand abstraction from the transition metal compound and the concomitant formation of the ionic catalyst composition of the invention.

Additional organometallic transition metal compounds suitable as olefin polymerization catalysts in accordance with the invention will be any of those Group 4–10 that can be converted by ligand abstraction into a catalytically active cation and stabilized in that active electronic state by a noncoordinating or weakly coordinating anion sufficiently labile to be displaced by an olefinically unsaturated monomer such as ethylene. Exemplary compounds include those described in the patent literature. U.S. Pat. No. 5,318,935 describes bridged and unbridged bisamido transition metal catalyst compounds of Group 4 metals capable of insertion polymerization of α-olefins. International patent publications WO 96/23010, WO 97/48735 and Gibson, et. al., Chem. Comm., pp. 849–850 (1998), disclose diimine-based ligands for Group 8–10 metal compounds shown to be suitable for ionic activation and olefin polymerization. See also WO 97/48735. Transition metal polymerization catalyst systems from Group 5–10 metals wherein the active transition metal center is in a high oxidation state and stabilized by low coordination number polyanionic ancillary ligand systems are described in U.S. Pat. No. 5,502,124 and its divisional U.S. Pat. No. 5,504,049. Bridged bis(arylamido) Group 4 compounds for olefin polymerization are described by D. H. McConville, et al, in Organometallics 1995, 14, 5478–5480. Synthesis methods and compound characterization are presented. Further work appearing in D. H. McConville, et al, Macromolecules 1996, 29, 5241–5243, described the bridged bis(arylamido) Group 4 compounds are active catalysts for polymerization of 1-hexene. Additional transition metal compounds suitable in accordance with the invention include those described in WO 96/40805. Each of these documents is incorporated by reference for the purposes of U.S. patent practice.

When using the catalysts of the invention, particularly when immobilized on a support, the total catalyst system will generally additionally comprise one or more scavenging compounds. The term "scavenging compounds" as used in this application and its claims is meant to include those compounds effective for removing polar impurities from the reaction environment. Impurities can be inadvertently introduced with any of the polymerization reaction components, particularly with solvent, monomer and catalyst feed, and adversely affect catalyst activity and stability. It can result in decreasing or even elimination of catalytic activity, particularly when ionizing anion pre-cursors activate the catalyst system. The polar impurities, or catalyst poisons include water, oxygen, metal impurities, etc. Preferably steps are taken before provision of such into the reaction vessel, for example by chemical treatment or careful separation techniques after or during the synthesis or preparation of the various components, but some minor amounts of scavenging compound will still normally be used in the polymerization process itself.

Typically the scavenging compound will be an excess of the alkylated Lewis acids needed for initiation, as described above, or will be additional known organometallic compounds such as the Group-13organometallic compounds of U.S. Pat. Nos. 5,153,157, 5,241,025 and WO-A-91/09882, WO-A-94/03506, WO-A-93/14132, and that of WO 95/07941. Exemplary compounds include triethyl aluminum, triethyl borane, triisobutyl aluminum, methylalumoxane, isobutyl aluminumoxane, and tri-n-octyl aluminum. Those scavenging compounds having bulky or $C_6$–$C_{20}$ linear hydrocarbyl substituents covalently bound to the metal or metalloid center being preferred to minimize adverse interaction with the active catalyst. Examples include triethylaluminum, but more preferably, bulky compounds such as triisobutylaluminum, triisoprenylaluminum, and long-chain linear alkyl-substituted aluminum compounds, such as tri-n-hexylaluminum, tri-n-octylaluminum, or tri-n-dodecylaluminum. When alumoxane is used as an activator, any excess over the amount needed to activate the catalysts present will act as scavenger compounds and additional scavenging compounds may not be necessary. Alumoxanes also may be used in scavenging amounts with other means of activation, e.g., methylalumoxane and triisobutyl-aluminoxane. The amount of scavenging agent to be used with Group 3–10 catalyst compounds of the invention is minimized during polymerization reactions to that amount effective to enhance activity and avoided altogether if the feeds and polymerization medium can be sufficiently free of adventitious impurities.

The catalyst complexes of the invention are useful in polymerization of unsaturated monomers conventionally known to be polymerizable under coordination polymerization using metallocenes. Such conditions are well known and include solution polymerization, slurry polymerization, gas-phase polymerization, and high pressure polymerization. The catalyst of the invention may be supported (preferably as described above) and as such will be particularly useful in the known operating modes employing fixed-bed, moving-bed, fluid-bed, slurry or solution processes conducted in single, series or parallel reactors. Pre-polymerization of supported catalyst of the invention may also be used for further control of polymer particle morphology in typical slurry or gas phase reaction processes in accordance with conventional teachings.

In alternative embodiments of olefin polymerization methods for this invention, the catalyst system is employed in liquid phase (solution, slurry, suspension, bulk phase or combinations thereof), in high pressure liquid or supercritical fluid phase, or in gas phase. Each of these processes may also be employed in singular, parallel or series reactors. The liquid processes comprise contacting olefin monomers with the above described catalyst system in a suitable diluent or solvent and allowing said monomers to react for a sufficient time to produce the invention copolymers. Hydrocarbyl solvents are suitable, both aliphatic and aromatic, hexane and toluene are preferred. Bulk and slurry processes are typically done by contacting the catalysts with a slurry of liquid monomer, the catalyst system being supported. Gas phase processes typically use a supported catalyst and are conducted in any manner known to be suitable for ethylene homopolymers or copolymers prepared by coordination polymerization. Illustrative examples may be found in U.S. Pat. Nos. 4,543,399, 4,588,790, 5,028,670, 5,382,638, 5352, 749, 5,436,304, 5,453,471, and 5,463,999, and WO 95/07942. Each is incorporated by reference for purposes of U.S. patent practice.

Generally speaking the polymerization reaction temperature can vary from about 40° C. to about 250° C. Preferably the polymerization reaction temperature will be from 60° C. to 220°, more preferably below 200° C. The pressure can vary from about 1 mm Hg to 2500 bar, preferably from 0.1 bar to 1600 bar, most preferably from 1.0 to 500 bar.

Linear polyethylene, including high and ultra-high molecular weight polyethylenes, including both homo- and copolymers with other alpha-olefin monomers, alpha-olefinic and/or non-conjugated diolefins, for example, $C_3$–$C_{20}$ olefins, diolefins or cyclic olefins, are produced by adding ethylene, and optionally one or more of the other monomers, to a reaction vessel under low pressure (typically<50 bar), at a typical temperature of 40–250° C. with the invention catalyst that has been slurried with a solvent, such as hexane or toluene. Heat of polymerization is typically removed by cooling. Gas phase polymerization can be conducted, for example, in a continuous fluid bed gas-phase reactor operated at 2000–3000 kPa and 60–160° C., using hydrogen as a reaction modifier (100–200 PPM), $C_4$–$C_8$ comonomer feedstream (0.5–1.2 mol %), and $C_2$ feedstream (25–35 mol %). See, U.S. Pat. Nos. 4,543,399, 4,588,790, 5,028,670 and 5,405,922 and 5,462,999, which are incorporated by reference for purposes of U.S. patent practice.

Ethylene-α-olefin (including ethylene-cyclic olefin and ethylene-α-olefindiolefin) elastomers of high molecular weight and low crystallinity can be prepared utilizing the catalysts of the invention under traditional solution polymerization processes or by introducing ethylene gas into a slurry utilizing the α-olefin or cyclic olefin or mixture thereof with other monomers, polymerizable and not, as a polymerization diluent in which the invention catalyst is suspended. Typical ethylene pressures will be between 10 and 1000 psig (69–6895 kPa) and the polymerization diluent temperature will typically be between 40 and 160° C. The process can be carried out in a stirred tank reactor, or more than one operated in series or parallel. See the general disclosure of U.S. Pat. No. 5,001,205 for general process conditions. See also, international application WO 96/33227 and WO 97/22639. All documents are incorporated by reference for description of polymerization processes, metallocene selection and useful scavenging compounds.

Other olefinically unsaturated monomers besides those specifically described above may be polymerized using the catalysts according to the invention, for example, styrene, alkyl-substituted styrenes, isobutylene, ethylidene norbornene, norbornadiene, dicyclopentadiene, and other olefinically-unsaturated monomers, including other cyclic olefins, such as cyclopentene, norbornene, and alkyl-substituted norbornenes. Additionally, alpha-olefinic macromonomers of up to 1000 mer units, or more, may also be incorporated by copolymerization.

The catalyst compositions of the invention can be used as described above individually for coordination polymerization or can be mixed to prepare polymer blends with other known olefin polymerization catalyst compounds. By selection of monomers, blends of coordination catalyst compounds, polymer blends can be prepared under polymerization conditions analogous to those using individual catalyst compositions. Polymers having increased MWD for improved processing and other traditional benefits available from polymers made with mixed catalyst systems can thus be achieved.

The formation of blended polymers can be achieved ex situ through mechanical blending or in situ through the use of a mixed catalyst system. It is generally believed that in situ blending provides a more homogeneous product and allows the blend to be produced in one step. The use of mixed catalyst systems for in situ blending involves combining more than one catalyst in the same reactor to simultaneously produce multiple distinct polymer products. This method requires additional catalyst synthesis and the various catalyst components must be matched for their activities, the polymer products they generate at specific conditions, and their response to changes in polymerization conditions.

The following examples are presented to illustrate the foregoing discussion. All parts, proportions and percentages are by weight unless otherwise indicated. All examples were carried out in dry, oxygen-free environments and solvents. Although the examples may be directed to certain embodiments of the present invention, they are not to be viewed as limiting the invention in any specific respect. In these examples certain abbreviations are used to facilitate the description. These include standard chemical abbreviations for the elements and certain commonly accepted abbreviations, such as: Me=methyl, THF, or thf,=tetrahydrofuran, and Cp*, permethylated cyclopentadienyl metal ligand.

All molecular weights are weight average molecular weight unless otherwise noted. Molecular weights (weight average molecular weight (Mw) and number average molecular weight (Mn) were measured by Gel Permeation Chromatography, unless otherwise noted, using a Waters 150 Gel Permeation Chromatograph equipped with a differential refractive index detector and calibrated using polystyrene standards. Samples were run in either THF (45° C.) or in 1,2,4-trichlorobenzene (145° C.) depending upon the sample's solubility using three Shodex GPC AT-80 M/S columns in series. This general technique is discussed in "Liquid Chromatography of Polymers and Related Materials III'" J. Cazes Ed., Marcel Decker, 1981, page 207, which is incorporated by reference for purposes of U.S. patent practice herein. No corrections for column spreading were employed; however, data on generally accepted standards, e.g. National Bureau of Standards Polyethylene 1475, demonstrated a precision with 0.1 units for Mw/Mn which was calculated from elution times. The numerical analyses were performed using Expert Ease software available from Waters Corporation.

Experimental

Trispentafluorophenylborane was purchased from Boulder Chem. Co. and used as received. Al($C_6F_5$)$_3$ was prepared according to the method of Biagini, P. et al. (EP 0 694 548). Bromotetrafluoropyridine, trityl chloride, toluene, pentane, butyl lithium, and methyl lithium were purchased from Aldrich. The toluene was further dried over a sodium/potassium alloy. The silica used herein was obtained from Davison. Triethylaluminum was purchased from Akzo Nobel. (1,3-BuMeCp)$_2$ZrCl$_2$ was purchased from Boulder Chemical Co. (1,3-BuMeCp)$_2$ZrMe$_2$ was obtained by the reaction of (1,3-BuMeCp)$_2$ZrCl$_2$ with two equivalents of methyl lithium in diethyl ether. Me$_2$Si(H$_4$-indenyl)$_2$Zr(CH$_3$)$_2$) was obtained from Witco. Elemental Analyses were performed by Galbraith Laboratories, Inc.

ACTIVATOR PREPARATIONS

1. Li[(C$_6$F$_5$)$_3$B(C$_5$F$_4$N)].

6.80 grams of bromotetrafluoropyridine (BrC$_5$F$_4$N) were added to 300 mls of pentane in a one liter Schlenk flask. The flask was equipped with a addition funnel loaded with 11.8 mls of 2.5 M butyl lithium in hexane. The solution was cooled to −78° C. and butyl lithium was added slowly over the course of one half hour. A white precipitate forms. 15.1 grams of B(C$_6$F$_5$)$_3$ was added via cannula to the white slurry. After several hours the slurry was allowed to warm to room temperature. The solvent was removed and a white solid remained.

2. [(C$_6$H$_5$)$_3$C][(C$_6$F$_5$)$_3$B(C$_5$F$_4$N)]

7.3 grams of Li[(C$_6$F$_5$)$_3$B(C$_5$F$_4$N)] was combined with trityl chloride ((C$_6$H$_5$)$_3$CCl)(2.9 grams) in dichloromethane. An orange solution with LiCl precipitate resulted immediately upon mixing. The slurry was allowed to stir overnight. The solution was filtered through celite and the solvent was removed. Pentane was added and an orange powder was obtained in quantitative yields. $^{19}$F NMR (THF-d$_8$; ref. to CF$_3$C$_6$H$_5$ δ=−62.5) δ−98.7 (2F), −132.1 (4F), −132.5 (2F), −135 (2F), −162.1 (1F), −162.5 (2F), −166.6 (6F). Elemental Analysis (C$_{41}$F$_{19}$H$_{15}$NB); Calcd. C. 55.1%, H 1.7%, N 1.6%, F 40.4%: Found: C. 54.8%, H 1.8%, N 1.6%, F 32.5%.

3. Li[(C$_6$F$_5$)$_3$Al(C$_5$F$_4$N)]

3.00 grams of bromotetrafluoropyridine (BrC$_5$F$_4$N) were added to 300 mls of pentane in a one liter Schlenk flask. The flask was equipped with a addition funnel loaded with 5.2 mls of 2.5 M butyl lithium in hexane. The solution was cooled to −78° C. and butyl lithium was added slowly over the course of one half hour. A white precipitate forms. 8.0 grams of (toluene)Al(C$_6$F$_5$)$_3$ was added via cannula to the white slurry. After several hours the slurry was allowed to warm to room temperature. The solvent was removed and a white solid remained.

4. [(C$_6$H$_5$)$_3$C][(C$_6$F$_5$)$_3$Al(C$_5$F$_4$N)]

1.2 grams of Li[(C$_6$F$_5$)$_3$Al(C$_5$F$_4$N)] was combined with trityl chloride ((C$_6$H$_5$)$_3$CCl)(0.45 grams) in dichloromethane. An orange solution with LiCl precipitate resulted immediately upon mixing. The slurry was allowed to stir overnight. The solution was filtered through celite and the solvent was removed. Pentane was added and an orange powder was obtained in quantitative yields. $^{19}$F NMR; (CD$_2$Cl$_2$; ref to CF$_3$C$_6$H$_5$ δ=−62.5) δ−97.6 (2F), −122.1 (6F), −126.4 (2F), −157.1 (3F), −163.6 (6F). Elemental Analysis (C$_{41}$F$_{19}$H$_{15}$NAl); Calcd. C. 54.7%, H 1.6%, N 1.5%, F 39.2%: Found: C 58.8%, H 2.4%, N 1.2%, F 25.8%.

SUPPORTED CATALYST PREPARATION AND POLYMERIZATIONS

5. Catalyst A 0.1 grams of (1,3-BuMeCp)$_2$ZrMe$_2$ was combined with 0.23 grams of [(C$_6$H$_5$)$_3$C][(C$_6$F$_5$)$_3$B(C$_5$F$_4$N)] in five mls of toluene. The resulting yellow solution was combined with silica (Davison 600° C.; treated with triethylaluminum to neutralize hydroxyl groups, e.g., as described in WO 91/09882; and then treated with 1,9-decadiyne (0.8 grams of decadiyne per 70 grams of triethylaluminum-treated silica stirred overnight at room temperature)). After stirring the slurry for thirty minutes in toluene, the slurry was filtered and the resulting silica was washed with 20 mls of toluene and dried under vacuum yielding a tan powder. Elemental analysis: Zr wt %=0.35.

6. Slurry-Phase Ethylene-Hexene Polymerization using Catalyst A.

Polymerizations were conducted in a stainless steel, 1-liter Zipperclave autoclave reactor. The reactor was equipped with water jacket for heating and cooling. Injections were performed via a high pressure nitrogen injection. (400 mls isobutane, 30 mls of hexene, and 15 μls triethylaluminum) Before polymerizations the reactor was purged with nitrogen for several hours at 100° C. Upon injection of catalyst ethylene was fed continuously on demand keeping the reactor pressure constant (130 psig ethylene) while maintaining the reaction temperature at 85° C. After the allotted time the reaction was stopped by cooling and venting the pressure and exposing the contents of the reactor to air. The liquid components were evaporated and the poly(ethylene-co-hexene-1) resin was dried under a N$_2$ purge. Weight average molecular weight (Mw), number average molecular weight (Mn) and their ratio Mw/Mn were obtained by GPC gel permeation chromotagraphy. Hexene wt % incorporation was obtained from $^1$H NMR data.

The above procedure was performed using 25 mgs of Catalyst A. After 40 minutes the reaction was stopped. No reactor fouling was observed and 4.82 grams of polymer resin (321 g pol./g cat. h) was obtained. Run 1: Mw=143000, Mn=49100, Mw/Mn=2.93; Hexene wt %=5.9.

7. Catalyst B 0.1 grams of (1,3-BuMeCp)$_2$ZrMe$_2$ was combined with 0.23 grams of [(C$_6$H$_5$)$_3$C][(C$_6$F$_5$)$_3$B(C$_5$F$_4$N)] in five mls of toluene. The resulting yellow solution was combined with silica (Davison 600° C. treated—triethylaluminum/1,9-decadiyne treated, as in Ex. 5). After stirring the slurry for thirty minutes in toluene at 75° C., the slurry was filtered and the resulting silica was washed with 20 mls of toluene and dried under vacuum yielding a tan powder.

8. Slurry-Phase Ethylene-Hexene Polymerization using Catalyst B.

The polymerization was run according to the procedure outlined in experiment 6 using catalyst B. No reactor fouling was observed and the polymer resin yield was 4.89 grams (326 g pol./g cat. h). Run 1: Mw=184000, Mn=78300, Mw/Mn=2.353; Hexene wt %=3.9.

9. Catalyst C 0.1 grams of (1,3-BuMeCp)$_2$ZrMe$_2$ was combined with 0.23 grams of [(C$_6$H$_5$)$_3$C][(C$_6$F$_5$)$_3$B(C$_5$F$_4$N)] in five mls of toluene. The resulting yellow solution was combined with silica (Davison, dried at 600° C.,—triethylaluminum treated) After stirring the slurry for thirty minutes in toluene at room temperature the slurry was dried under vacuum yielding a tan powder. Elemental Analysis: Zr wt %=0.72.

10. Slurry-Phase Ethylene-Hexene Polymerization using Catalyst C.

The polymerization was run according to the procedure outlined in experiment 6 using catalyst C. Reactor fouling was observed and the polymer resin yield was 8.7 grams (581 g pol./g cat. h). Run 1: Mw=146000, Mn=55400, Mw/Mn=2.63; Hexene wt %=4.7.

11. Comparative Catalyst 0.1 grams of (1,3-BuMeCP)$_2$ZrMe$_2$ was combined with 0.20 grams of [DMAH][(C$_6$F$_5$)$_4$B] in five mls of toluene. The resulting yellow solution was combined with silica (2.0 grams)(Davison dried at 600° C., and triethylaluminum/1,9-decadiyne treated, as in Ex. 5). After stirring the slurry for thirty minutes in toluene, the slurry was filtered and the resulting silica was washed with 20 mls of toluene and dried under vacuum yielding a yellow powder.

12. The polymerization was run according to the procedure outlined in experiment 6 using the comparative catalyst of example 11. The polymer resin yield was 37.2 grams (2480 g pot./g cat. h). Run 1: Mw=54800, Mn=21200, Mw/Mn=2.59; Hexene wt %=6.1.

Solution Catalyst Preparation and Polymerizations

Polymerizations were conducted in a stainless steel, 1-liter Zipperclave autoclave reactor. The reactor was equipped with water jacket for heating and cooling. Injections were typically done through a septum inlet or were injected via a high pressure nitrogen injection. Before polymerizations the reactor was purged with nitrogen for several hours at 100° C. Upon injection of catalyst ethylene was fed continuously on demand keeping the reactor pressure constant while maintaining the reaction temperature at 60° C. After the allotted time the reaction was stopped by cooling and venting the pressure and exposing the contents of the reactor to air. The liquid components were evaporated and the poly(ethylene-co-hexene-1) was dried in a vacuum oven. Weight average molecular weight (Mw), number average molecular weight (Mn) and their ratio Mw/Mn were obtained by GPC gel permeation chromatagraphy. Hexene wt % incorporation was obtained from FTIR calibration data. Note: The polymerizations were run in the absence of scavenger; hence, the first injection of catalyst played the role of scavenger in these polymerization runs.

13. Catalyst D $Me_2Si(2-Me-indenyl)_2Zr(CH_3)_2$ (20 mg) and $[(C_6H_5)_3C][(C_6F_5)_3B(C_5F_4N)]$(40 mg) were combined in 10 mls of toluene. The resulting solution is yellow. 2 mls of the catalyst precursor solution was injected into a 1L stainless steel reactor preheated to 60° C. containing 45 mls of hexene, 75 psi of ethylene, and 500 mls of toluene. After several minutes 1 ml of the catalyst precursor solution was injected into the reactor.

After 30 minutes the polymerization reaction was stopped and 26.2 grams of polymer was isolated (Run 1=35.8, Run 2=70.0) grams of polymer was isolated. Run 1: Mw=86000, Mn=38400, Mw/Mn=2.25; Hexene wt %=16.8. Run 2: Mw=104000, Mn=52300, Mw/Mn=1.99; Hexene wt %=26.7.

14. Catalyst E $Me_2Si(2-Me-indenyl)_2Zr(CH_3)_2)$(20 mg) and $[(C_6H_5)_3C][(C_6F_5)_3Al(C_5F_4N)]$(40 mg) were combined in 10 mls of toluene. The resulting solution is yellow. 3 mls of the catalyst precursor solution was injected into a 1L stainless steel reactor preheated to 60° C. containing 45 mls of hexene, 75 psi of ethylene, and 500 mls of toluene. After several minutes 1 ml of the catalyst precursor solution was injected into the reactor. After 30 minutes the polymerization reaction was stopped and (Run 1=5.64, Run 2=24.6) grams of polymer was isolated. Run 1: Mw=84400, Mn=47500, Mw/Mn=1.79; Hexene wt %=14.0. Run 2: Mw=92900, Mn=51500, Mw/Mn=1.81; Hexene wt %=13.2.

15. Comparative to Catalysts D and E $Me_2Si(2-Me-indenyl)_2Zr(CH_3)_2)$(20 mg) and $[(C_6H_5)_3C][(C_6F_5)_4B]$(56 mg) were combined in 10 mls of toluene. The resulting solution is yellow. 2 mls of the catalyst precursor solution was injected into a 1L stainless steel reactor preheated to 60° C. containing 75 psi of ethylene, and 500 mls of toluene. After several minutes 1 ml of the catalyst precursor solution was injected into the reactor. After 30 minutes the polymerization reaction was stopped and (Run 1=16.1, Run 2=20.3) grams of polymer was isolated. Run 1: Mw=82400, Mn=44700, Mw/Mn=1.84; Hexene wt %=16.8. Run 2: Mw=75100, Mn=37300, Mw/Mn=2.01; Hexene wt %=23.7.

16. Catalyst F $(1,3-Me,BuCp)_2Zr(CH_3)_2$(30 mg) and $[(C_6H_5)_3C][(C_6F_5)_3B(C_5F_4N)]$(72 mg) were combined in 10 mls of toluene. The resulting solution is yellow. 2 mls of the catalyst precursor solution was injected into a 1L stainless steel reactor preheated to 60° C. containing 45 mls of hexene, 75 psi of ethylene, and 500 mls of toluene. After several minutes 1 ml of the catalyst precursor solution was injected into the reactor. After 30 minutes the polymerization reaction was stopped and 24.6 grams of polymer was isolated. Run 1: Mw=321000, Mn=153000, Mw/Mn=2.10; Hexene wt %=2.2.

17. Catalyst G $(1,3-Me,BuCp)_2Zr(CH_3)_2$(20 mg) and $[(C_6H_5)_3C][(C_6F_5)_3Al(C_5F_4N)]$(73 mg) were combined in 10 mls of toluene. The resulting solution is yellow. 2 mls of the catalyst precursor solution was injected into a 1L stainless steel reactor preheated to 60° C. containing 45 mls of hexene, 75 psi of ethylene, and 500 mls of toluene. After several minutes 1 ml of the catalyst precursor solution was injected into the reactor. After 30 minutes the polymerization reaction was stopped and 12.2 grams of polymer was isolated. Run 1: Mw=454000, Mn=182000, Mw/Mn=2.50; Hexene wt %=2.4.

18. Comparative to Catalyst F and Catalyst G $(1,3-Me,BuCp)_2Zr(CH_3)_2$(20 mg) and $[(C_6H_5)_3C][(C_6F_5)_4B]$(71 mg) were combined in 10 mls of toluene. The resulting solution is yellow. 2 mls of the catalyst precursor solution was injected into a 1L stainless steel reactor preheated to 60° C. containing 75 psi of ethylene, and 500 mls of toluene. After 30 minutes the polymerization reaction was stopped and 67.7 grams of polymer was isolated. Run 1: Mw=120000, Mn=19400, Mw/Mn=6.17; Hexene wt %=16.2.

I claim:

1. An olefin polymerization catalyst which is the reaction product of 1) at least one transition metal compound having at least one ancillary, stabilizing ligand and at least two labile ligands suitable for insertion of olefins and capable of abstraction or removal so as to form an active cationic transition metal center and 2) a Group 13 element cocatalyst complex wherein at least one halogenated, nitrogen-containing aromatic group ligand is bonded to the Group 13 element.

2. The catalyst of claim 1 wherein said reaction product is physically or chemically fixed to a support material.

* * * * *